(12) United States Patent
Severson et al.

(10) Patent No.: US 9,502,051 B1
(45) Date of Patent: Nov. 22, 2016

(54) METHODS AND DEVICES FOR REDUCING COUPLE IMBALANCE IN A HARD DRIVE

(71) Applicant: Seagate Technology LLC, Cupertino, CA (US)

(72) Inventors: Sam Severson, Longmont, CO (US); Paul Clark, Longmont, CO (US); Jason Morris, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/854,412

(22) Filed: Sep. 15, 2015

(51) Int. Cl.
*G11B 17/02* (2006.01)
*G11B 5/09* (2006.01)
*G11B 17/038* (2006.01)

(52) U.S. Cl.
CPC .............. *G11B 5/09* (2013.01); *G11B 17/038* (2013.01)

(58) Field of Classification Search
None
See application file for complete search history.

(56) References Cited

U.S. PATENT DOCUMENTS

| | | | | |
|---|---|---|---|---|
| 3,964,341 A * | 6/1976 | Rabenhorst | ............. | F16C 15/00 74/572.12 |
| 4,683,505 A * | 7/1987 | Schmidt | ............. | G11B 23/0021 360/133 |
| 5,572,382 A * | 11/1996 | Kuno | ...................... | F16F 15/32 360/98.08 |
| 5,631,787 A * | 5/1997 | Huang | .................. | G11B 25/043 360/97.14 |
| 5,811,678 A * | 9/1998 | Hirano | .................... | F16F 15/36 73/461 |
| 6,158,112 A * | 12/2000 | Kim | ..................... | G11B 17/038 29/603.03 |
| 6,178,063 B1 * | 1/2001 | Wood | ................... | G11B 17/038 360/98.07 |
| 6,421,199 B1 * | 7/2002 | McKenzie | ......... | G11B 5/59627 360/77.04 |
| 6,453,541 B1 * | 9/2002 | Guthrie | ................ | G11B 17/038 29/603.03 |
| 6,651,311 B1 * | 11/2003 | Kim | ...................... | G11B 17/038 29/603.03 |
| 6,678,114 B2 * | 1/2004 | Jicrapipalanakul | | G11B 19/2009 360/98.07 |
| 6,698,286 B1 * | 3/2004 | Little | ...................... | G01M 1/36 360/98.06 |
| 6,839,956 B2 * | 1/2005 | Watanabe | ............ | G11B 17/038 29/596 |
| 7,669,711 B1 * | 3/2010 | Westwood | ......... | G11B 19/2027 206/307 |
| 7,757,377 B2 * | 7/2010 | Ruden | .................. | G11B 17/038 29/603.01 |
| 7,872,830 B2 | 1/2011 | Ruden et al. | | |
| 8,069,554 B2 | 12/2011 | Ruden et al. | | |
| 2002/0112342 A1 * | 8/2002 | Guthrie | ................ | G11B 17/038 29/603.03 |
| 2003/0192166 A1 * | 10/2003 | Kelemen | .............. | G11B 17/038 29/603.03 |
| 2010/0053805 A1 * | 3/2010 | Oh | ...................... | G11B 19/2027 360/98.07 |
| 2011/0188155 A1 * | 8/2011 | Lee | ...................... | G11B 17/035 360/98.08 |

FOREIGN PATENT DOCUMENTS

JP          05159508 A   *   6/1993

* cited by examiner

*Primary Examiner* — Will J Klimowicz
(74) *Attorney, Agent, or Firm* — Faegre Baker Daniels LLP

(57) ABSTRACT

In certain embodiments, an apparatus includes a basedeck; a motor coupled to the basedeck and having a rotatable hub; and first, second, third, fourth, and fifth discs coupled to the hub. Three of the five discs are biased against the hub in a first direction and two of the five discs are biased against the hub in a second direction. In certain embodiments, a method includes biasing at least three discs against a hub in a first direction and biasing at least two discs against the hub in a second direction.

3 Claims, 7 Drawing Sheets

METHODS AND DEVICES FOR REDUCING COUPLE IMBALANCE IN A HARD DRIVE

SUMMARY

In certain embodiments, an apparatus includes a basedeck; a motor coupled to the basedeck and having a rotatable hub; and first, second, third, fourth, and fifth discs coupled to the hub. Three of the five discs are biased against the hub in a first direction and two of the five discs are biased against the hub in a second direction. In certain embodiments, a method includes biasing at least three discs against a hub in a first direction and biasing at least two discs against the hub in a second direction.

DETAILED DESCRIPTION

The present disclosure relates to devices, systems, and methods for reducing couple imbalance in hard drives. Couple imbalance—typically given in units of mass*area—can negatively affect a hard drive's performance. For example, when a hard drive is operating and its motor and discs are rotating, couple imbalance may cause the hard drive to generate unwanted noise and vibration, which can cause misalignment errors when reading data from and writing data to a disc in a hard disc drive. One contributor to couple imbalance is imbalance caused by a disc pack and how the pack's discs are positioned and biased along a motor hub. Certain embodiments of the present disclosure are accordingly directed to systems, devices, and methods to position discs to reduce a couple imbalance in a hard disc drive.

Figure 1:
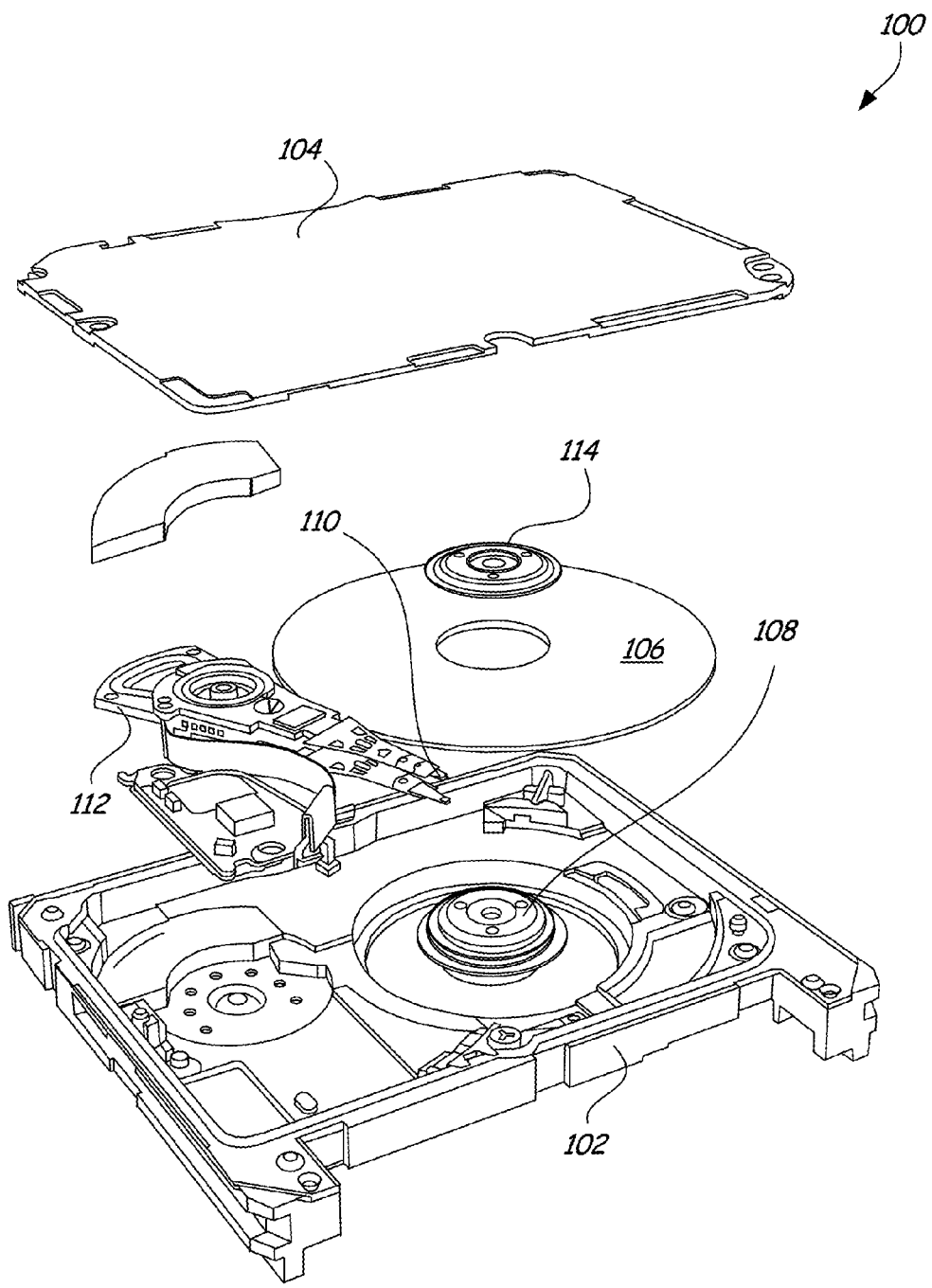
FIG. 1 provides an isometric exploded view of a hard disk drive.

FIG. 1 shows an exploded view of a hard disk drive 100 including a basedeck 102, top cover 104, and various data storage components. The basedeck 102 and top cover 104 can form a housing for components such as magnetic discs 106 for recording and storing data, a spindle motor 108 to rotate the discs 106, a head stack assembly (HSA) 110, and an actuator 112. Discs are secured to the motor 108 by a disc clamp 114 so that, during operation, discs rotate with the motor 108. The disc clamp 114 can be secured to the motor 108 by fasteners such as screws. For example, the motor 108 and disc clamp 114 in FIG. 1 are each shown as having three areas for receiving fasteners. The HSA 110 includes a magnetic head for writing data to and reading data from magnetic discs 106. The actuator 112 is coupled to the magnetic head and moves the magnetic head by operation of a voice coil motor to position the magnetic head over the rotating discs 106.

Figure 2:
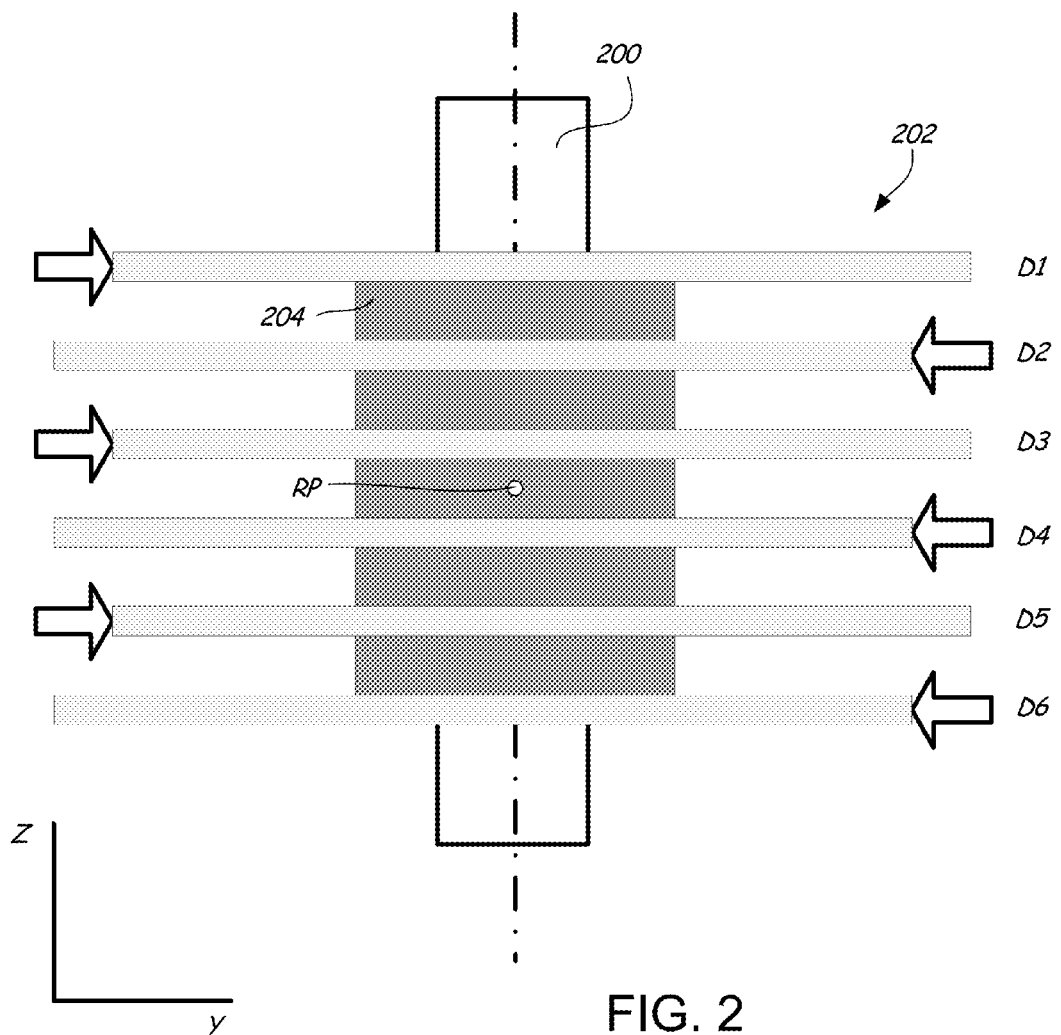
FIG. 2 provides a side view of a hub and disc pack, in accordance with certain embodiments of the present disclosure.
Figure 3:
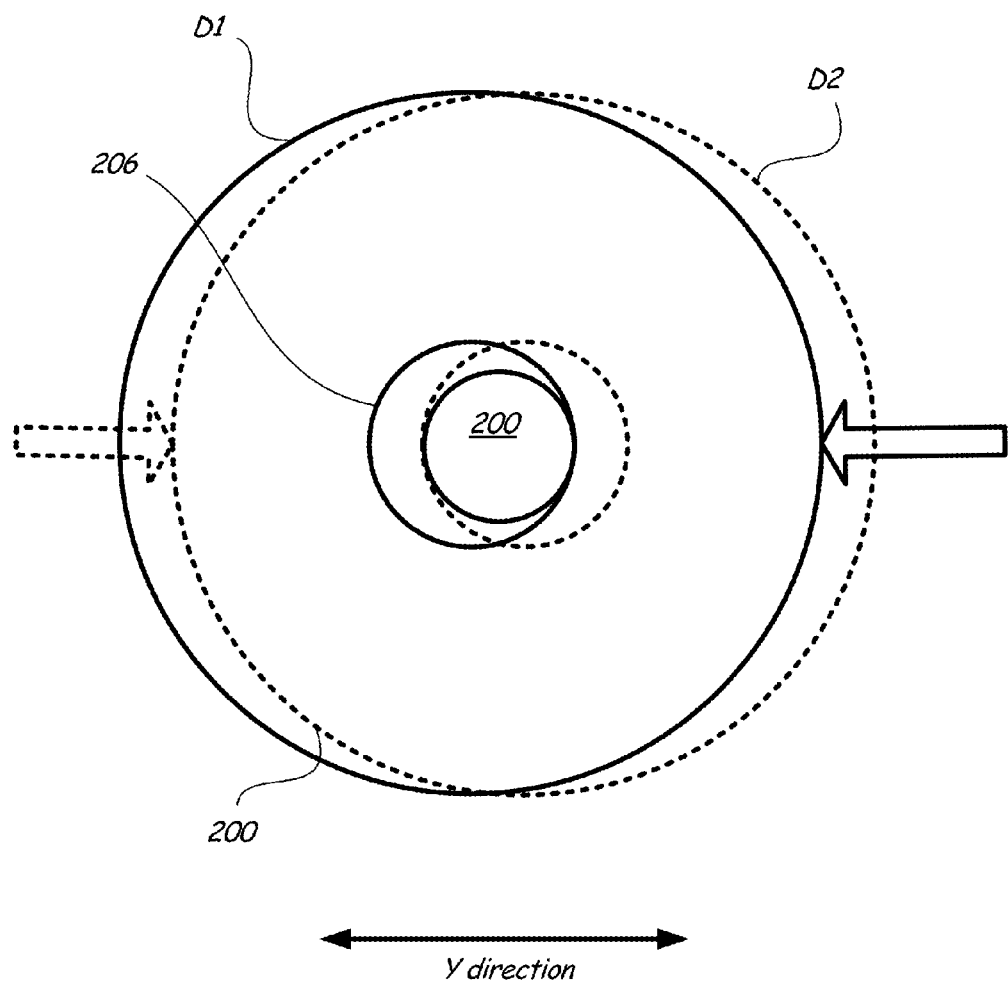
FIG. 3 provides a top view of part of a disc pack, in accordance with certain embodiments of the present disclosure.

FIG. 2 shows a side view of a hub 200 (part of a hard disc drive's motor), disc pack 202 having discs D1-D6, and spacers 204. FIG. 3 shows a top view of the top two discs D1 and D2 in the disc pack 202. The disc pack 202 is shown having six discs (D1-D6) that are indirectly stacked above one another. In other words, the discs do not directly contact each other. Each disc has an inner diameter surface 206 that abuts against the hub 200. The discs are shown being biased in opposing directions. In this pattern, the biasing direction alternates for each disc. For example, the bottom disc is biased in a first direction while the disc above it is biased in a second, opposite direction (e.g., ~180 degrees).

A disc pack's contribution to couple imbalance can depend on a disc pack's biasing pattern. Couple imbalance can be calculated by summing each disc's contribution to the disc pack's imbalance, as follows:

$$\text{Disc imbalance of each disc} = (0.5 * M_D * B_D * (D_t + S_t)) * z * B_o \quad \text{Equation 1:}$$

where
$M_D$=mass of disc
$B_D$=disc bias direction (either 1 or −1)
$D_t$=disc thickness
$S_t$=spacer thickness
z=distance of disc from reference point (RP)
$B_o$=disc bias offset.

Assuming that certain variables are constant for each disc in a disc pack (e.g., $M_D$, $D_t$, $S_t$, and $B_o$), the primary variable that can be modified to control couple imbalance of a disc pack is the order of disc bias directions (e.g., z and $B_D$ of each disc). For example, for the pattern in FIG. 2, assume the outermost discs (D1, D6) are 2.5 units away in the Z direction from a reference point RP positioned at the center of the hub and disc pack. Discs above the reference point (i.e., D1-D3) are given a positive number for the purpose of equation 1, and discs below the reference point (i.e., D4-D6) are given a negative number. The second set of discs (D2, D5) is 1.5 units away from the reference point, and the innermost discs (D3, D4) are 0.5 units away. Each disc is given a −1 or 1 for its disc bias direction, $B_D$, in the Y direction. Discs biased towards the right of the page (as shown by arrows) are given a −1 for the purpose of equation 1. When $B_D * z$ for each disc is summed together (e.g., (2.5*−1)+(1.5*1)+(0.5*−1)+(−0.5*1)+(−1.5*−1)+(−2.5*1)), the result is −3, which is multiplied by the constant (e.g., $0.5 * M_D * B_D * (D_t + S_t)$), which may be fixed for a given disc design. So, a larger summation of a disc pack's $B_D * z$ results in a larger couple imbalance for the disc pack. Described below are other biasing configurations of disc packs.

Figure 4:
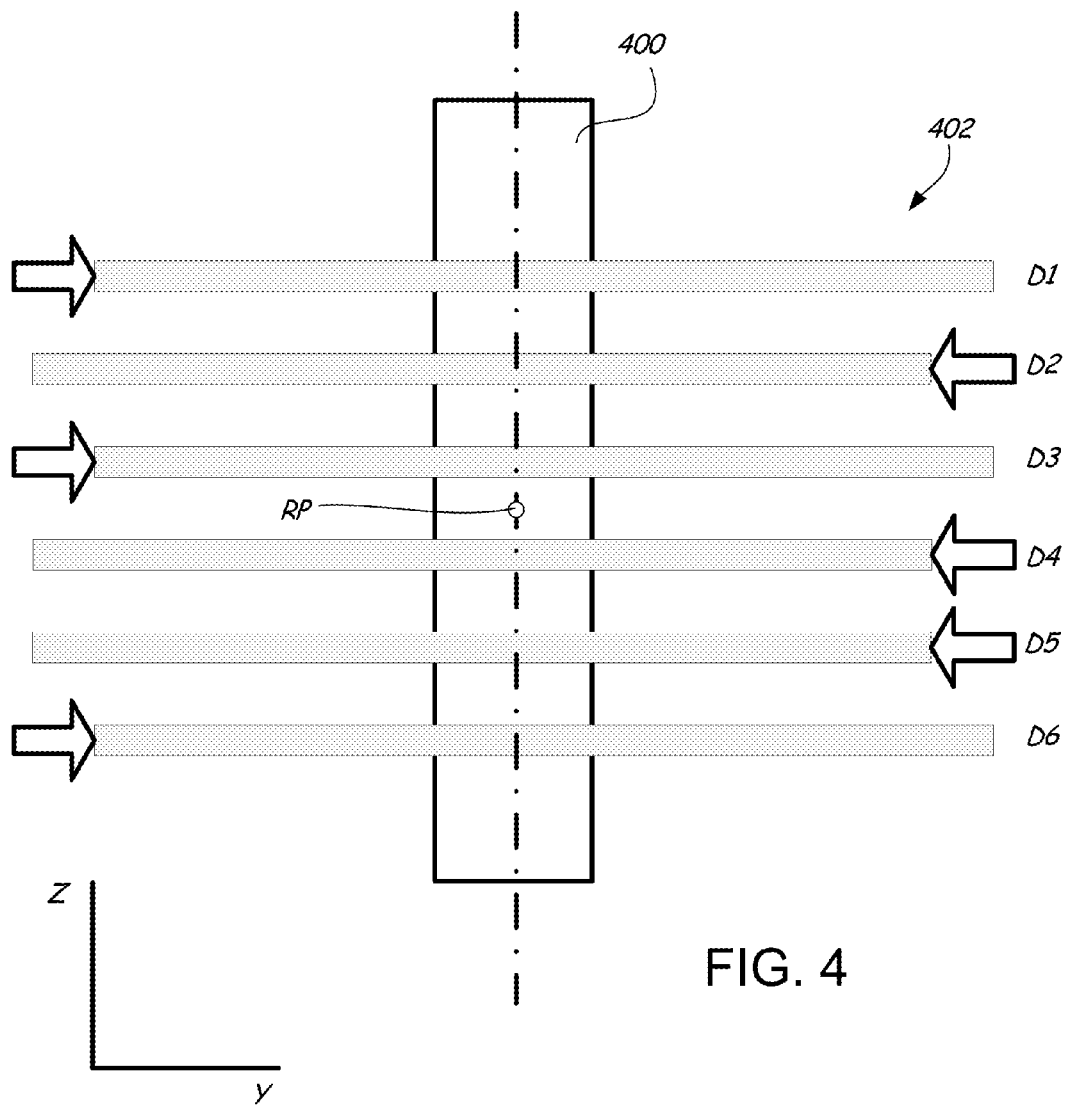
FIG. 4 provides a side view of a hub and disc pack, in accordance with certain embodiments of the present disclosure.

FIG. 4 shows a side view of a hub 400 and disc pack 402. The disc pack 402 is shown having six discs (D1-D6) that are stacked above one another. Each disc has an inner diameter surface that abuts against the hub 400. The discs are shown being biased in opposing first and second directions. In this pattern the first set of discs (D1, D3, and D6) are biased in the first direction while the second set of discs (D2, D4, D5) are biased in the second, substantially opposite direction. For the purposes of this disclosure, "substantially opposite" means being within +/−10 degrees of 180 degrees.

Applicants also recognize that the discs can be oppositely aligned within 0-5, 0-2.5, 0-1, 0-0.5, and 0-0.1 degrees of 180 degrees.

The couple imbalance of disc pack 402 can be calculated using Equation 1 where the outermost discs (D1, D6) are 2.5 units away from a reference point RP positioned at the center of the hub and disc pack. Discs D2 and D5 are 1.5 units away from the reference point, and the innermost discs (D3, D4) are 0.5 units away. When $B_D*z$ for each disc is summed together (e.g., $(2.5*1)+(1.5*-1)+(0.5*-1)+(-0.5*1)+(-1.5*-1)+(-2.5*1)$), the result is $-1$, which is multiplied by the discs' constant (e.g., $0.5*M_D*B_D*(D_t+S_t)$). Comparing the couple imbalances of FIGS. 2 and 4, it can be seen that the configuration of FIG. 4 has a lower couple imbalance than the configuration of FIG. 2.

Figure 5:
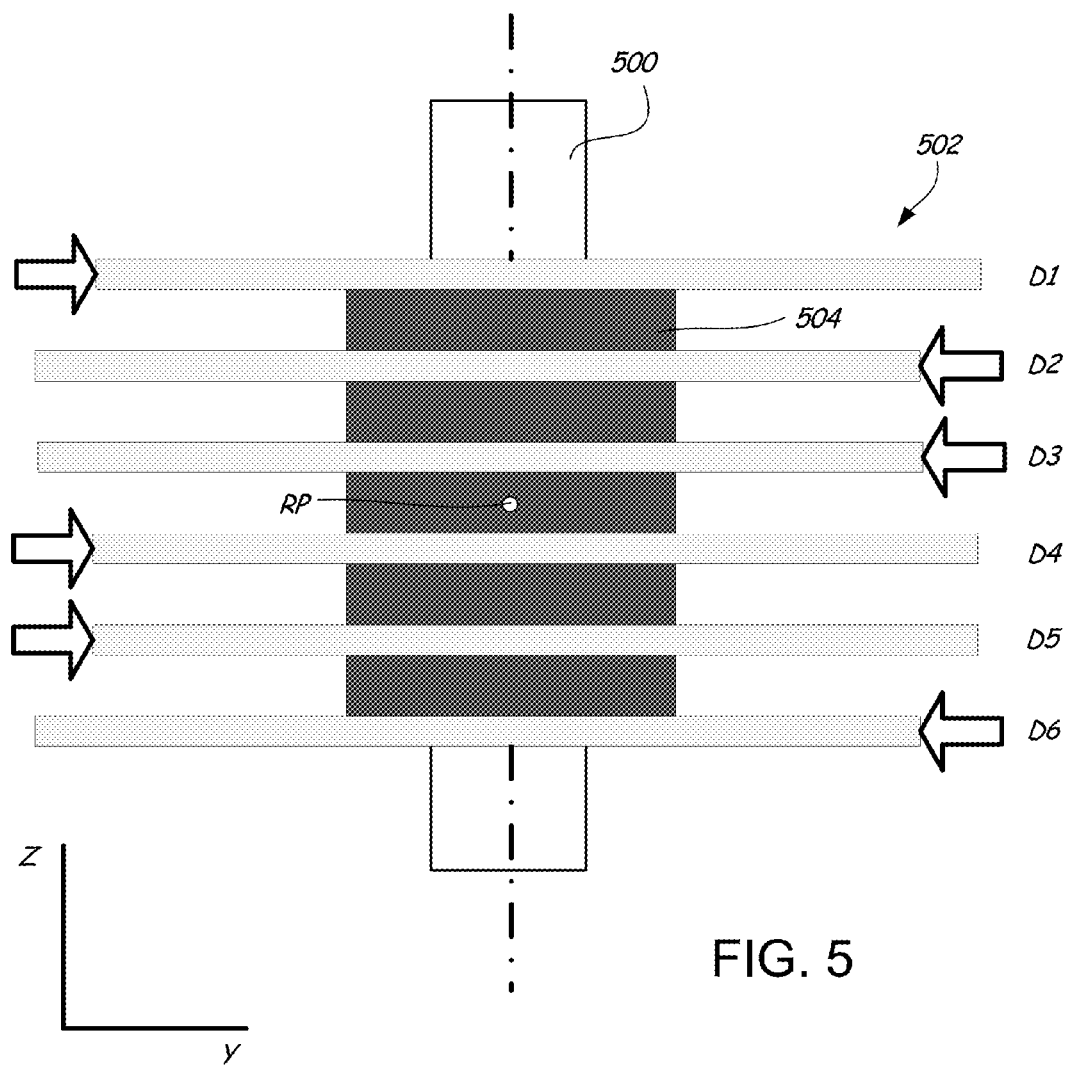
FIG. 5 provides a side view of a hub and disc pack, in accordance with certain embodiments of the present disclosure.

FIG. 5 shows a side view of a hub 500 and disc pack 502 with spacers 504. The disc pack 502 is shown having six discs (D1-D6) that are stacked above one another with spacer 504 positioned between. Each disc has an inner diameter surface that abuts against and contacts the hub 500. The discs are shown being biased in opposing directions. In this pattern, the first set of discs (D1, D4, and D5) is biased in a first direction while the second set of discs (D2, D3, and D6) is biased in a second, opposite direction.

The couple imbalance of disc pack 502 can be calculated using Equation 1 where the outermost discs (D1, D6) are 2.5 units away from a reference point RP positioned at the center of the hub and disc pack. Discs D2 and D5 are 1.5 units away from the reference point, and the innermost discs (D3, D4) are 0.5 units away. When $B_D*z$ for each disc is summed together (e.g., $(2.5*-1)+(1.5*1)+(0.5*1)+(-0.5*-1)+(-1.5*-1)+(-2.5*1)$), the result is $-1$, which is multiplied by the product line's constant (e.g., $0.5*M_D*B_D*(D_t+S_t)$). So, a smaller summation of a disc pack's $B_D*z$ results in a smaller couple imbalance.

Figure 6:
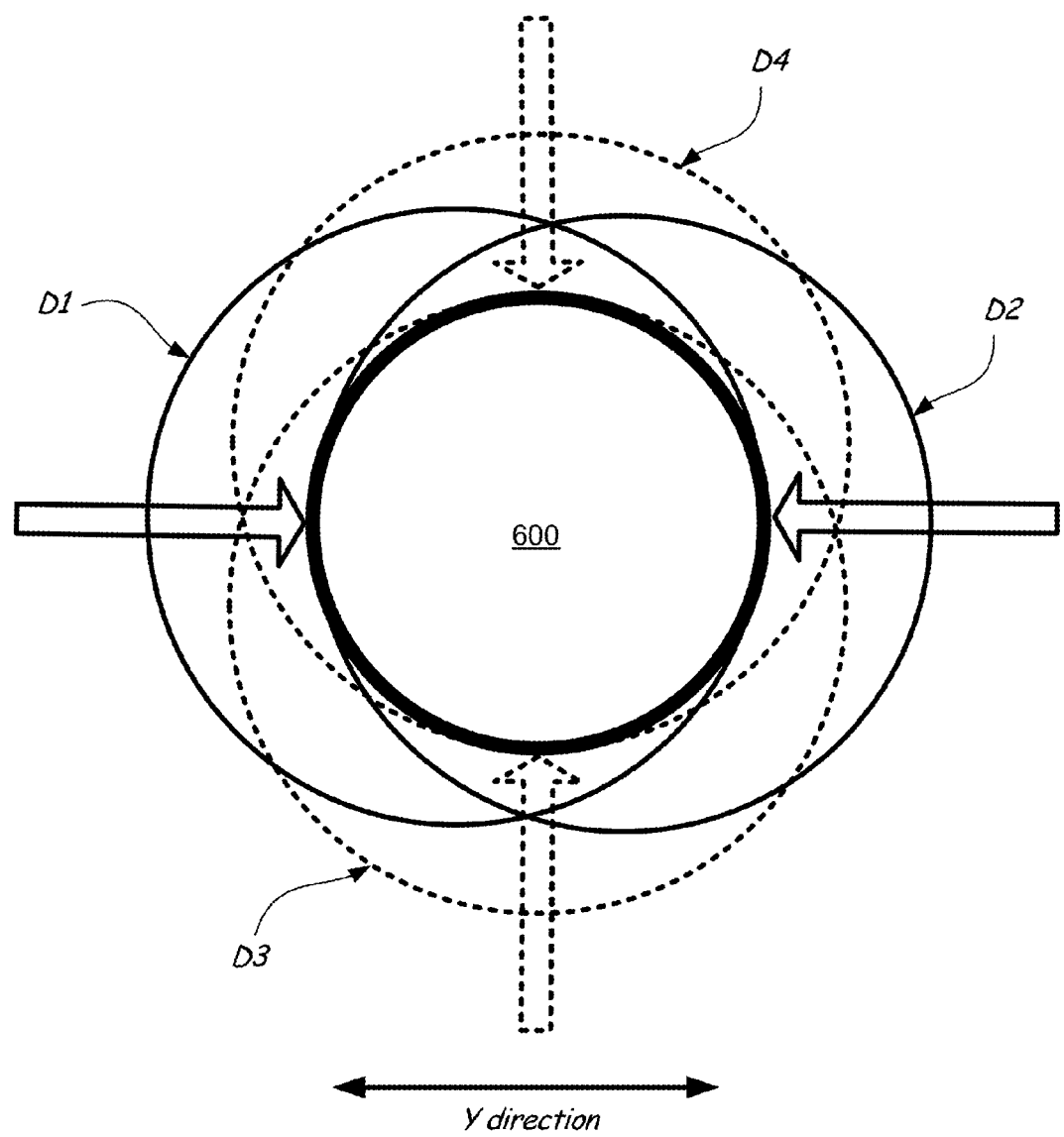
FIG. 6 provides a top view of part of a disc pack, in accordance with certain embodiments of the present disclosure.

FIG. 6 shows a top view of a hub 600 and inner diameters of four discs (D1-D4) each of which are biased against the hub 600. For simplicity and clarity, only the inner diameters of four discs are shown. The first and second discs (D1, D2) are biased in substantially opposite directions of each other. The third and fourth discs (D3, D4) are also biased in substantially opposite directions of each other and substantially perpendicular to the biasing directions of the first and second discs. Biasing in more than two directions provides additional flexibility in managing a disc pack's couple imbalance when the pack includes several discs.

Figure 7:
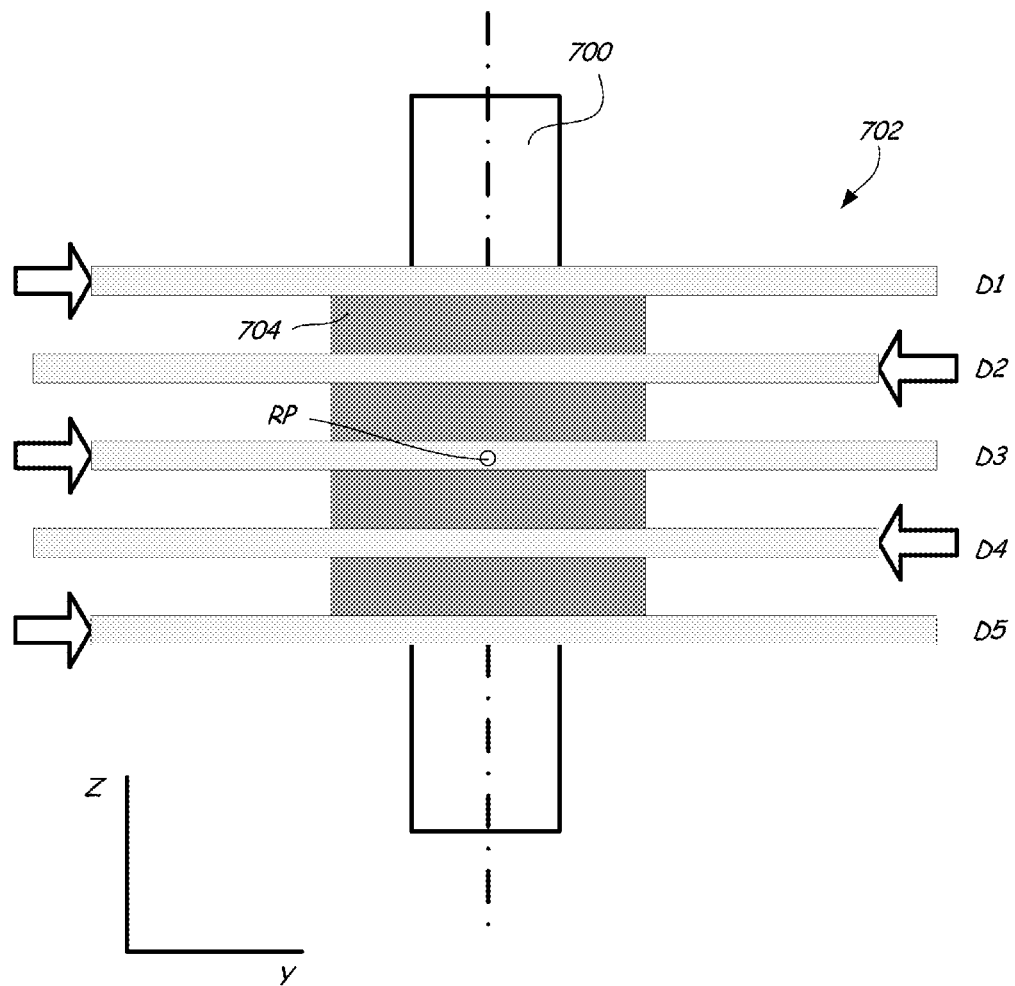
FIG. 7 provides a side view of a hub and disc pack, in accordance with certain embodiments of the present disclosure.

Although previous figures have shown disc packs with a certain number of discs, Applicants recognize that the present disclosure can apply to disc packs with fewer or more discs. For example, FIG. 7 shows a disc pack having five discs (D1-D5). The middle disc (D3) is positioned at a reference point RP such that its $B_D*z$ calculation equals zero and does not contribute to a couple imbalance. As the demand for digital storage continues to increase, more discs may be added to individual hard drives to increase a drive's storage capacity.

The biasing of discs may be carried out using various tools and methods—such as those described by Ruden et. al in U.S. Pat. No. 7,757,377—that are designed to accommodate the configurations described above. It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method for biasing discs for coupling to a hub, the method comprising:
    biasing at least one of the discs against the hub in a first direction;
    biasing at least one of the discs against the hub in a second direction that is substantially opposite the first direction;
    biasing at least one of the discs against the hub in a third direction; and
    biasing at least one of the discs against the hub in a fourth direction, wherein the third and fourth directions are substantially opposite of each other, and wherein the first direction and the third direction are substantially perpendicular to each other.

2. The method of claim 1, wherein each of the discs has an inner diameter surface that abuts against the hub.

3. The method of claim 1, wherein the biasing steps are performed simultaneously.

* * * * *